United States Patent
Tsuda

(10) Patent No.: US 11,936,292 B2
(45) Date of Patent: Mar. 19, 2024

(54) COMBINED FEEDFORWARD AND FEEDBACK CONTROL OF A SWITCHED CAPACITOR CONVERTER

(71) Applicant: Murata Manufacturing Co., Ltd., Nagaokakyo (JP)

(72) Inventor: Kazunori Tsuda, Nagaokakyo (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 198 days.

(21) Appl. No.: 17/570,403

(22) Filed: Jan. 7, 2022

(65) Prior Publication Data
US 2022/0278611 A1    Sep. 1, 2022

(30) Foreign Application Priority Data
Feb. 26, 2021   (JP) ................. 2021-030844

(51) Int. Cl.
*H02M 3/07*     (2006.01)
*H02M 1/00*     (2006.01)

(52) U.S. Cl.
CPC .......... *H02M 3/07* (2013.01); *H02M 1/0016* (2021.05); *H02M 1/007* (2021.05)

(58) Field of Classification Search
CPC ................. H02M 3/07–078; H02M 1/007
See application file for complete search history.

(56) References Cited

U.S. PATENT DOCUMENTS

| | | | | |
|---|---|---|---|---|
| 11,146,167 | B1* | 10/2021 | Aboueldahab | H02M 1/32 |
| 2009/0224743 | A1* | 9/2009 | Bairanzade | H02M 3/07 323/293 |
| 2011/0304306 | A1* | 12/2011 | Galal | H02M 3/07 323/282 |
| 2013/0147273 | A1* | 6/2013 | van der lee | H02M 3/33561 307/31 |
| 2016/0197552 | A1* | 7/2016 | Giuliano | H02M 3/07 363/60 |
| 2019/0229623 | A1* | 7/2019 | Tsuda | H02M 3/073 |
| 2022/0239216 | A1* | 7/2022 | Jang | H02M 1/0035 |

FOREIGN PATENT DOCUMENTS

JP    6521187 B2    5/2019

* cited by examiner

*Primary Examiner* — Peter M Novak
(74) *Attorney, Agent, or Firm* — Keating & Bennett, LLP

(57) ABSTRACT

A voltage converter includes a capacitive voltage conversion circuit to receive an input voltage, convert the input voltage into an output voltage, and output the output voltage. The voltage converter also includes an output capacitor, an inductor coupled in series between the capacitive voltage conversion circuit and the output capacitor, a voltage detector, and a controller. The capacitive voltage conversion circuit includes switches, at least one flying capacitor, and an intermediate capacitor at an output portion of the capacitive voltage conversion circuit. The voltage detector detects a voltage at a node that is a connection point of the intermediate capacitor and the inductor. The controller controls the switches to change between at least two states by comparing the result of voltage detection to a threshold.

18 Claims, 12 Drawing Sheets

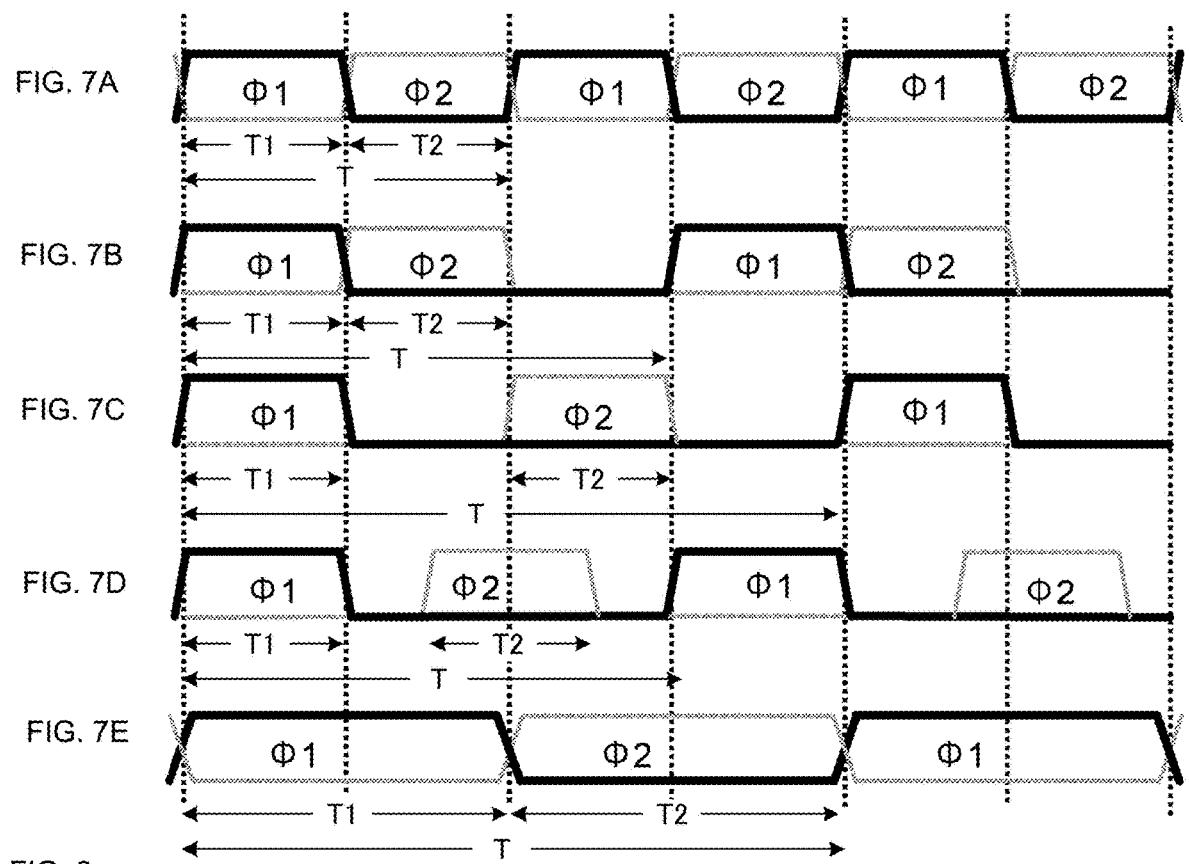
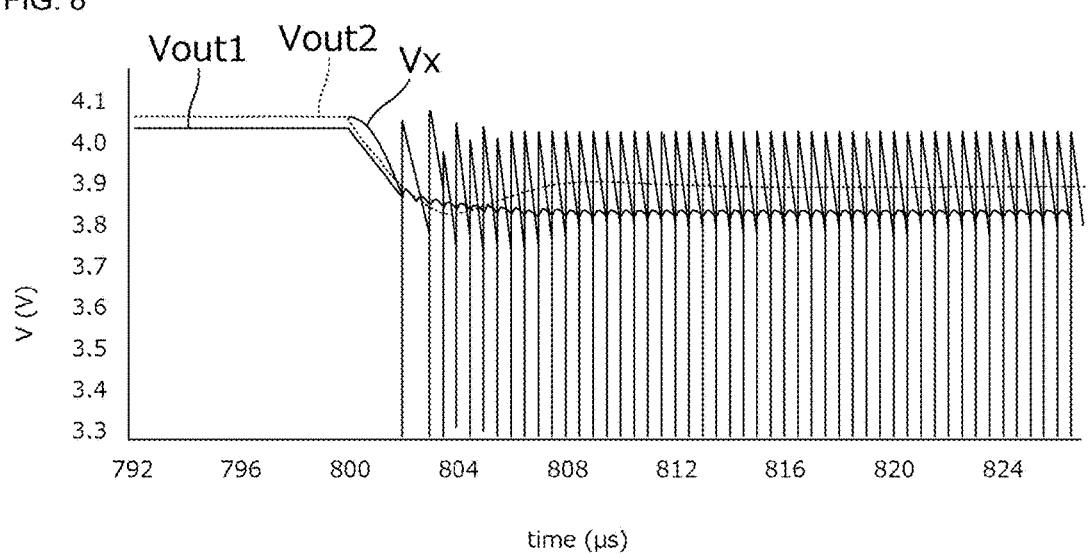

COMBINED FEEDFORWARD AND FEEDBACK CONTROL OF A SWITCHED CAPACITOR CONVERTER

CROSS REFERENCE TO RELATED APPLICATIONS

This application claims the benefit of priority to Japanese Patent Application No. 2021-030844 filed on Feb. 26, 2021. The entire contents of this application are hereby incorporated herein by reference.

BACKGROUND OF THE INVENTION

1. Field of the Invention

The present invention relates to a voltage converter including a capacitive voltage conversion circuit.

2. Description of the Related Art

It is relatively easy to miniaturize a voltage converter including a capacitive voltage conversion circuit referred to as switched capacitor circuit or a charge pump circuit, because such a voltage converter does not need any inductive element such as a transformer. Thus, it can be said that this voltage converter is suitable for compact power supply devices for low power use.

There are various capacitive voltage conversion circuits configured in different manners. Typical examples include the Dickson type and the series-parallel type. Other examples include the ladder type and the Fibonacci type. A capacitor network circuit including a plurality of capacitors and a plurality of switches is controlled to changeably provide at least two kinds of connections so as to output a decreased or increased input voltage.

Japanese Patent No. 6521187 discloses an example of a voltage converter including a capacitive voltage conversion circuit. The voltage converter described in Japanese Patent No. 6521187 is a charge pump circuit including an inductor, the voltage converter is formed by coupling an inductor between a general charge pump circuit and an output capacitor.

The DC-DC converter of Japanese Patent No. 6521187 provides switching by using a switching frequency equal to or higher than a resonant frequency determined by the capacitance of a capacitive power converter and the capacitance and inductance of an LC circuit, and as a result, it is possible to reduce losses and improve the efficiency of voltage conversion.

In a general charge pump circuit without the inductor described in Japanese Patent No. 6521187, a resistive switch changes connections between flying capacitors and electric charges move. At this time, a C-R-C circuit is formed, and a large amount of peak current flows between the flying capacitors. As a result, almost half the total energy moved between the flying capacitors changes to loss.

In contrast, the voltage converter described in Japanese Patent No. 6521187 includes an inductor, and by satisfying conditions for resonance occurring at the inductor, the losses caused by this movement of electric charges are substantially reduced. As a result, high efficiency conversion can be achieved.

For more stable resonance conditions, the voltage converter described in Japanese Patent No. 6521187 is configured to achieve almost the same resonant frequency between a first connection state and a second connection state and operate at a switching frequency higher than the resonant frequency. Consequently, the efficiency of voltage conversion can be improved.

In the voltage converter described in Japanese Patent No. 6521187, the switch changes connections between the flying capacitors to convert voltage, and thus, ripple voltage output occurs. The output capacitor smooths the ripple voltage. For this reason, it is important to set the capacitance of the output capacitor to be larger than the capacitance of the flying capacitor causing the ripple voltage.

An intermediate capacitor stabilizes the voltage before the inductor, and thus, increasing the capacitance of the intermediate capacitor can reduce the ripple voltage at the intermediate capacitor. When the capacitance of the intermediate capacitor is relatively large with respect to the capacitance of the flying capacitor, the efficiency of voltage conversion decreases. This is because the inserted inductor reduces the ripple of the charging current from the flying capacitor to the output capacitor. When the capacitance of the intermediate capacitor is relatively large, a large amount of current flows in the intermediate capacitor, and there is no need to provide the inductor. Thus, the capacitance of the intermediate capacitor should be smaller than the capacitance of the flying capacitor. As such, it is possible to produce a moderate amount of ripple without decreasing the efficiency of voltage conversion.

SUMMARY OF THE INVENTION

Preferred embodiments of the present invention provide voltage converters that are each able to output stable voltage with low ripple.

A voltage converter according to a preferred embodiment of the present invention includes a capacitive voltage conversion circuit to receive an input voltage, convert the input voltage into an output voltage, and output the output voltage, an output capacitor, an inductor coupled in series between the capacitive voltage conversion circuit and the output capacitor, a voltage detector, and a controller. The capacitive voltage conversion circuit includes a plurality of switches, at least one flying capacitor, and an intermediate capacitor at an output portion. The voltage detector is configured to detect a voltage at a node that is a connection point of the intermediate capacitor and the inductor. The controller is configured or programmed to control the switches to change between at least two states by comparing the voltage at the node to a threshold voltage.

A voltage converter according to a preferred embodiment of the present invention includes a plurality of capacitive voltage conversion circuits to receive an input voltage, convert the input voltage into a voltage, and output the voltage, a common output capacitor, a plurality of inductors coupled in series between the respective capacitive voltage conversion circuits and the output capacitor, and a plurality of voltage detectors and a plurality of controllers to control the respective capacitive voltage conversion circuits. The capacitive voltage conversion circuits each include a plurality of switches, at least one flying capacitor, and an intermediate capacitor at an output portion of the capacitive voltage conversion circuit. The voltage detectors are each configured to detect a voltage at a node that is a connection point of the intermediate capacitor and the inductor. The controllers to control the respective capacitive voltage conversion circuits are each configured or programmed to control the switches provided for the corresponding capacitive voltage conversion circuit by comparing a detection result of the voltage detector to a threshold to cause the switches to change between at least two kinds of states.

Preferred embodiments of the present invention provide voltage converters that are each able to output stable voltage with low ripple.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 7A to 7E are timing charts illustrating examples of the relationship between the period of the first connection state and the period of a second connection state in the voltage converter.

FIG. 8 is a waveform diagram of a voltage at a node that is the connection point of an intermediate capacitor and an inductor in the voltage converter and a waveform diagram of a voltage as a comparison target.

DETAILED DESCRIPTION OF THE PREFERRED EMBODIMENTS

Figure 1:
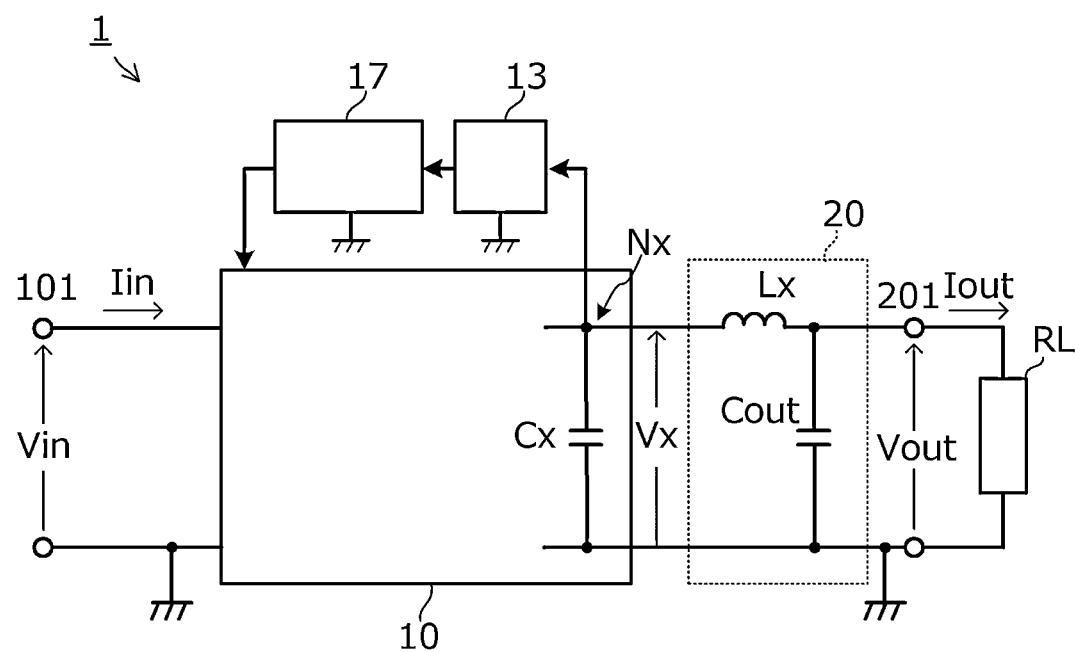
FIG. 1 is a block diagram of a voltage converter according to a first preferred embodiment of the present invention.

Preferred embodiments of the present invention by using specific examples with reference to the drawings. The same reference characters are used to denote the same or corresponding portions in the respective drawings. In consideration of simplicity of describing or understanding main points, for ease of description of preferred embodiments, the preferred embodiments will be individually described. However, the configurations described in the different preferred embodiments may be partially replaced or combined with each other. In second and subsequent preferred embodiments, descriptions of features and elements common to the first preferred embodiment are not repeated and only different points will be explained. In particular, the same or substantially the same effects and advantages achieved by the same or substantially the same configurations are not mentioned in every preferred embodiment.

First Preferred Embodiment

FIG. 1 is a block diagram of a voltage converter 1 according to a first preferred embodiment of the present invention. The voltage converter 1 includes a capacitive voltage conversion circuit 10 configured to receive an input voltage Vin, convert the input voltage Vin into an output voltage Vout, and output the output voltage Vout. The voltage converter 1 also includes an output capacitor Cout, an inductor Lx coupled in series between the capacitive voltage conversion circuit 10 and the output capacitor Cout, an intermediate capacitor Cx provided at an output portion of the capacitive voltage conversion circuit 10, a voltage detector 13, and a controller 17.

The voltage detector 13 detects a voltage Vx at a node Nx that is a connection point of the intermediate capacitor Cx and the inductor Lx. The inductor Lx and the output capacitor Cout define an LC circuit 20. The output capacitor Cout corresponds to an "output capacitor". The inductor Lx corresponds to an "inductor".

The voltage converter 1 lowers the input voltage Vin from an input power supply coupled to an input terminal 101 to the output voltage Vout and supplies the output voltage Vout to a load RL. An input current Iin is inputted to the voltage converter 1, and an output current Iout is outputted to the load RL.

Figure 2:
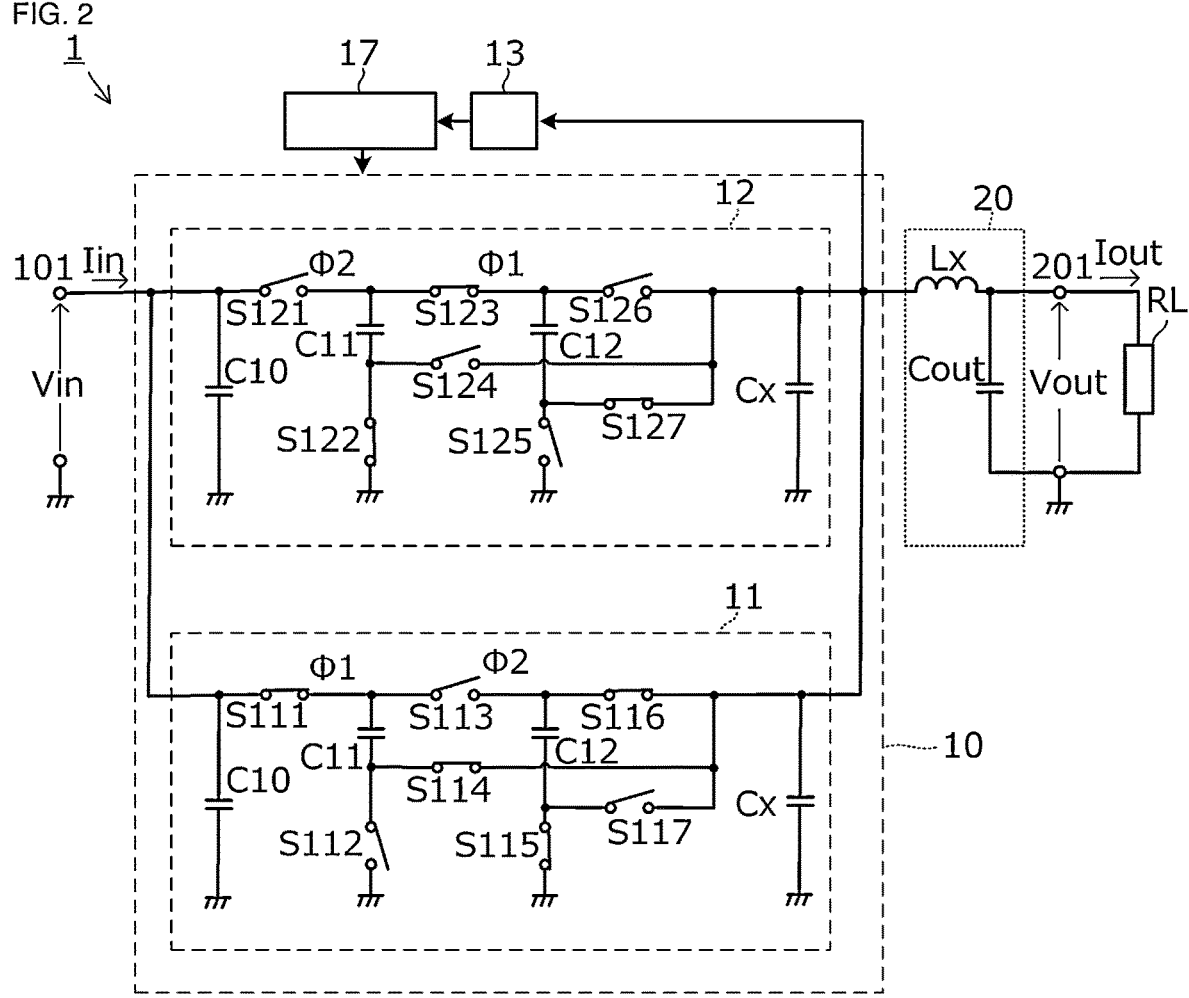
FIG. 2 illustrates an example of a circuit diagram of the voltage converter in FIG. 1.

FIG. 2 illustrates an example of a circuit diagram of the voltage converter 1. The capacitive voltage conversion circuit 10 includes a first capacitive voltage conversion circuit 11 and a second capacitive voltage conversion circuit 12 that are coupled in parallel with each other. The first capacitive voltage conversion circuit 11 and the second capacitive voltage conversion circuit 12 are both configured in the same or substantially the same manner. A plurality of flying capacitors C10, C11, and C12, the intermediate capacitor Cx, and a plurality of switch elements S111, S112, S113, S114, S115, S116, and S117 are disposed in the first capacitive voltage conversion circuit 11. The plurality of flying capacitors C10, C11, and C12, the intermediate capacitor Cx, and a plurality of switch elements S121, S122, S123, S124, S125, S126, and S127 are disposed in the second capacitive voltage conversion circuit 12.

The capacitive voltage conversion circuit 10 is provided by mounting devices such as integrated circuits and chip components on, for example, a circuit board. The inductor Lx and the output capacitor Cout are, for example, individual chip components separately mounted at the circuit board. The flying capacitors C10, C11, and C12, the intermediate capacitor Cx, and the output capacitor Cout are, for example, ceramic capacitors mounted at the circuit board. With this configuration, the area of the mounting surface can be easily reduced by using high-capacity ceramic capacitors.

The controller 17 controls the first capacitive voltage conversion circuit 11 and the second capacitive voltage conversion circuit 12 in an interleaved manner. As in the example illustrated in FIG. 2, when the switch elements S111, S114, S115, S116, S122, S123, and S127 are ON, and the switch elements S112, S113, S117, S121, S124, S125, and S126 are OFF, this state is referred to as a first connection state Φ1. When the switch elements S111, S114, S115, S116, S122, S123, and S127 are OFF, and the switch elements S112, S113, S117, S121, S124, S125, and S126 are ON, this state is referred to as a second connection state Φ2.

Additionally, the state in which all of the switch elements are OFF may be used as a third connection state to avoid undesirable power consumption caused by unnecessary current such as through current. This third state may be used as an intermediate state when the first connection state is changed to the second connection state or when the second connection state is changed to the first connection state. The present preferred embodiment does not describe the third connection state for ease of description.

Figure 3A:
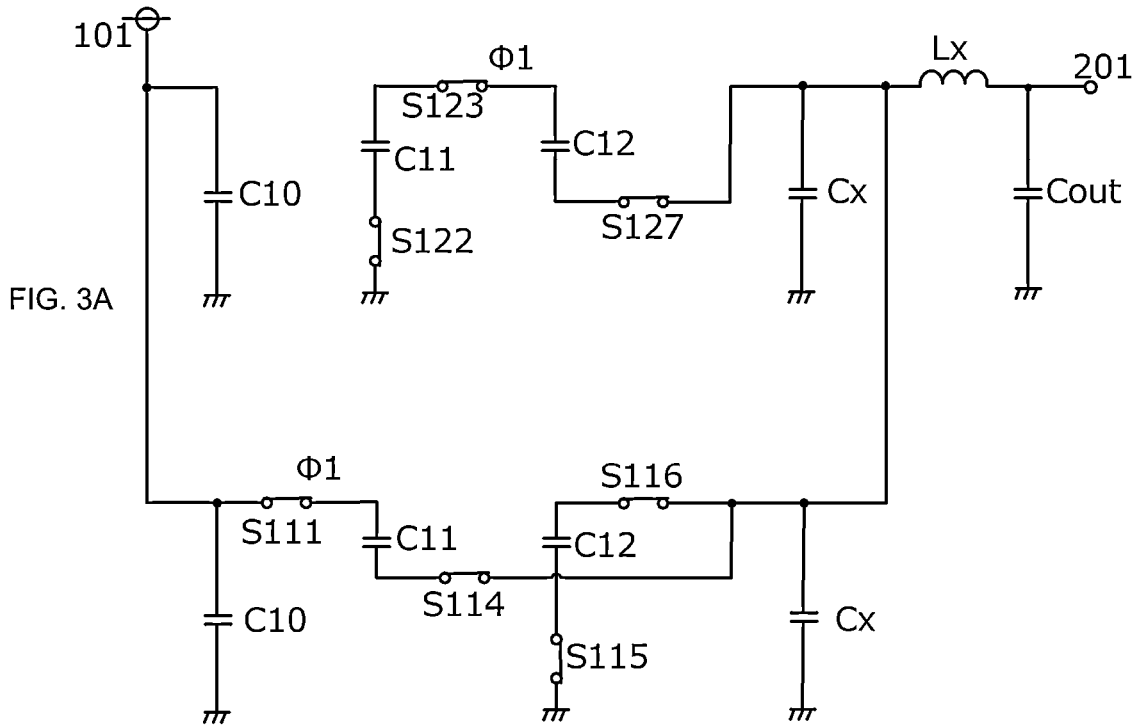
FIG. 3A is a circuit diagram when the circuit illustrated in FIG. 2 is in a first connection state.

FIG. 3A is a circuit diagram when the circuit illustrated in FIG. 2 is in the first connection state Φ1.

Figure 3B:
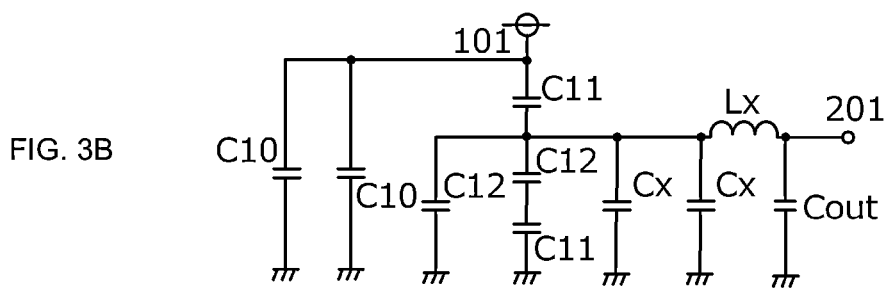
FIG. 3B is a circuit diagram when the impedance of a power supply is relatively high in the circuit illustrated in FIG. 3A, and the following expression is not satisfied: C10»C11.

FIG. 3B is a circuit diagram when the impedance of the power supply is relatively high (the impedance of the power supply is a considerable value) in the circuit illustrated in FIG. 3A, and the following expression is not satisfied: C10»C11, where C10 is the capacitance of the capacitor C10, and C11 is the capacitance of the capacitor C11.

Figure 3C:
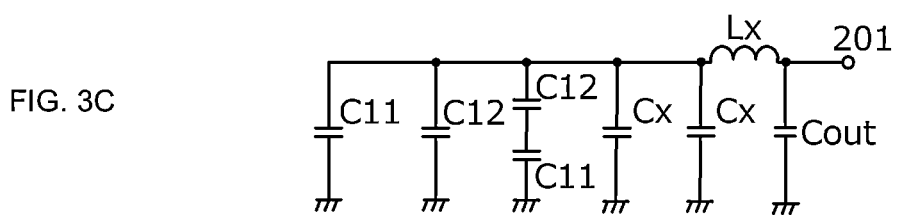
FIG. 3C is a circuit diagram when the impedance of the power supply in the circuit illustrated in FIG. 3A is sufficiently low.

FIG. 3C is a circuit diagram when the impedance of the power supply in the circuit illustrated in FIG. 3A is sufficiently low. FIG. 3C is also a circuit diagram when the capacitance of the capacitor C10 is sufficiently larger than the capacitance of the capacitor C11 (C10»C11). This means that, although the impedance of the power supply is a considerable value, when C10»C11, the capacitor C10 substantially hides the impedance of the power supply. This state is equivalently shown by the circuit illustrated in FIG. 3C.

An on-resistance RON of each switch element is negligibly small in FIGS. 3B and 3C.

Figure 4:
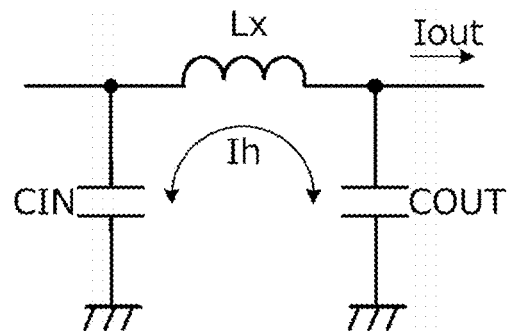
FIG. 4 is a circuit diagram shown in a combined manner based on the circuit illustrated in FIG. 3B or 3C.

FIG. 4 is a circuit diagram shown in a combined manner based on the circuit illustrated in FIG. 3B or 3C. As illustrated in FIG. 4, the capacitive voltage conversion circuit 10 and an LC circuit 20, which are illustrated in FIG. 1, together define an LC resonant circuit in which a composite capacitor CIN is disposed at an input end of the inductor Lx, and a capacitor COUT mainly including the capacitor Cout is disposed at an output end of the inductor Lx. A resonant current Ih flows in this LC resonant circuit.

When the impedance of the power supply is relatively high, and the capacitance of the capacitor C10 is relatively small (C10»C11 is not satisfied), in other words, in the case equivalently illustrated by FIG. 3B, a capacitance Cin of the composite capacitor CIN is provided by the following expression:

$$Cin = C13 + C13 + \cfrac{1}{\left(\cfrac{1}{C12} + \cfrac{1}{C11}\right)} + C12 + \cfrac{1}{\left(\cfrac{1}{C11} + \cfrac{1}{(C10 + C10)}\right)} \quad \text{(Expression 1)}$$

When the power supply is ideal with a sufficiently low impedance, or when the impedance of the power supply is a considerable value, but C10»C11, in other words, in the case of the equivalent circuit illustrated in FIG. 3C, the capacitance Cin of the composite capacitor CIN is provided by the following expression:

$$Cin = C13 + C13 + \cfrac{1}{\left(\cfrac{1}{C12} + \cfrac{1}{C11}\right)} + C12 + C11 \quad \text{(Expression 2)}$$

A resonant frequency Fh of the resonance circuit illustrated in FIG. 4 is provided by the following expression:

$$Fs = \cfrac{1}{2\pi\sqrt{L\left(\cfrac{Cin * Cout}{Cin + Cout}\right)}} \quad \text{(Expression 3)}$$

In consideration of simplicity of understanding, the first capacitive voltage conversion circuit 11 and the second capacitive voltage conversion circuit 12 are described as individual circuits, but parallelly coupled capacitors (capacitors coupled in a duplicated manner) may be provided as a single capacitor. For example, the capacitors C10 and C10 and the capacitors Cx and Cx can be both provided as single capacitors. The same holds for the switches. The switches provided in a duplicated manner can be configured as a common switch. These configurations can reduce the number of components.

Figure 5:
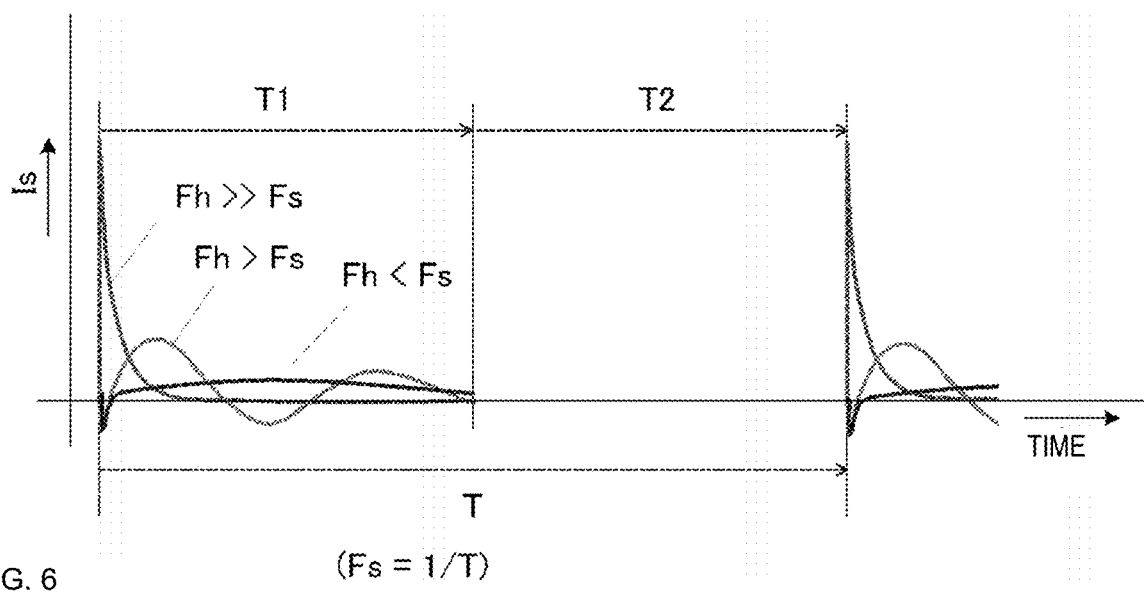
FIG. 5 is a waveform diagram illustrating plots of switching current versus switching period in relation to resonant frequency in the voltage converter.

FIG. 5 is a waveform diagram illustrating plots of a switching current Is versus a switching period T in relation to a resonant frequency Fh in the voltage converter 1. Here, the switching period T is the total of a period T1 of the first connection state Φ1 and a period T2 of the second connection state Φ2.

A switching frequency Fs is the inverse of the switching period T. Without consideration for times including blank times during which all of the switches are turned off, T=T1+T2, thus Fs=1/T. For ease of description, the following description is provided under this condition. The switching current Is in FIG. 5 simulates waveforms of the current flowing in the switch element S111. Here, the direction to the output is indicated as positive.

When electric power is transmitted from the capacitive voltage conversion circuit 10 to the capacitive or resistive load RL, the resonant frequency Fh is considerably higher than the switching frequency Fs (Fh»Fs). Thus, as illustrated in FIG. 5, a large amount of peak current flows, and this increases losses. When the inductor Lx is coupled to an output terminal 201 side, an inductive property appears. Accordingly, the resonant frequency Fh is slightly higher than the switching frequency Fs (Fh>Fs), and as illustrated in FIG. 5, the switching current Is has negative values in a given period. When the inductance of the inductor Lx increases, the resonant frequency Fh is lower than the switching frequency Fs (Fh<Fs), and as illustrated in FIG. 5, the switching current Is does not have negative values in any period and remains at very small values.

The output current from the capacitive voltage conversion circuit 10 is the total of currents flowing in the switches. The output current from the capacitive voltage conversion circuit 10 is calculated in accordance with the average of the total of currents. Concerning the three conditions in FIG. 5, when the total output current of the voltage converter 1 is Iout, the average current of each waveform indicating the current in the switch element S111 is about one-sixth of Iout. Thus, when the current waveform in FIG. 5 has negative values, in other words, when the current flows in the reverse direction, it is necessary to supply as compensation the same or substantially the same amount of current in the forward direction for the period T1 of the first connection state Φ1. As a result, the absolute value of the current flowing in the switch increases, and the heat loss at the switch increases, resulting in decreased efficiency.

Figure 6:
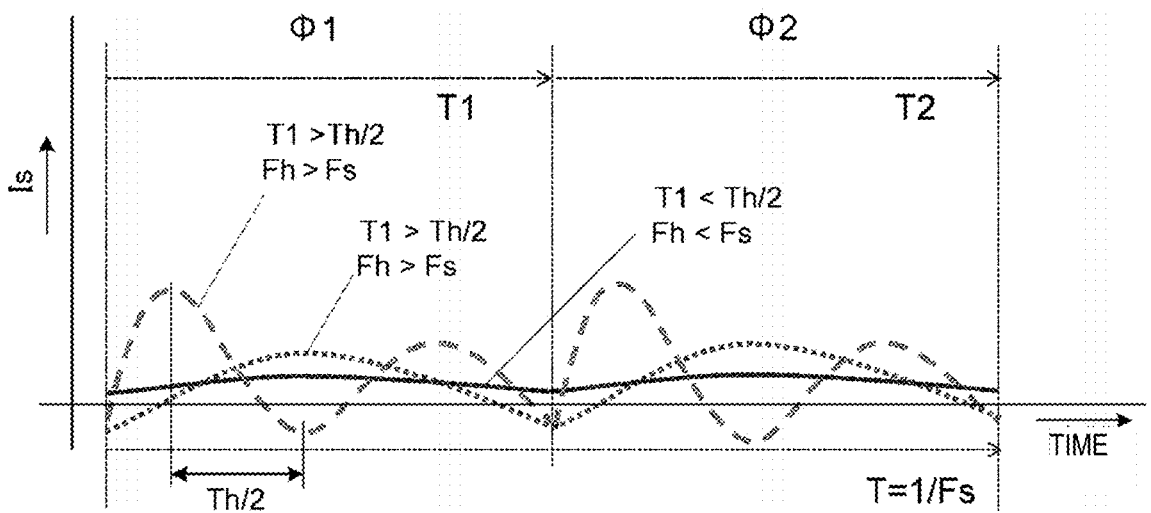
FIG. 6 is a waveform diagram illustrating plots of switching current versus switching period in relation to resonant frequency in the voltage converter.

With the circuit configuration according to the present preferred embodiment, the current caused by LC resonance can be effectively observed by measuring the current flowing in the inductor. Examples of waveforms are illustrated in FIG. 6. In FIG. 6, the average current value of each waveform is equal or substantially equal to the output current of the voltage converter. The waveforms have different shapes and peak values in relation to the resonant frequency Fh and the switching frequency Fs, similarly to FIG. 5.

In particular, under the condition that the period T1 of the first connection state Φ1 is larger than half of a resonance period Th that is the inverse of the resonant frequency Fh (Th/2), that is, T1>Th/2, the current flows in the reverse direction for a given period. Because the present configuration has the two connection states to transmit electric power, the following condition should be satisfied: the period T1 of the first connection state Φ1 is smaller than half of the resonance period Th that is the inverse of the resonant frequency Fh (Th/2), that is, T1<Th/2. The following condition should also be satisfied: the period T2 of the second connection state Φ2 is smaller than half of the resonance period Th that is the inverse of the resonant frequency Fh (Th/2), that is, T2<Th/2. Disconnected states including dead times are omitted from consideration.

As described above, when the resonant frequency Fh is higher than the switching frequency Fs, the current flowing in the reverse direction and the current flowing in the forward direction increase the amount of current passing the switch element, and losses increase. A heat loss PLS of the switch element is obtained by multiplying the on-resistance RON of the switch by the square of the current Is flowing in the switch element and then calculating an integral with respect to time. This means that simply using, for example, a filter to decrease the peak of current does not solve the problem. If an inductor is provided or if parasitic inductance occurs, losses may increase. The efficiency of voltage conversion can be improved by appropriately controlling the on-time of the switch element in accordance with calculation of the resonant frequency Fh according to the present preferred embodiment.

Thus, in the present preferred embodiment, the controller 17 is configured or programmed to provide switching by using the switching frequency Fs equal to or higher than the resonant frequency Fh determined by the capacitance of the capacitive voltage conversion circuit 10 and the capacitance and inductance of the LC circuit 20. In other words, switching is provided by using a switching period in which an on-period TN is equal to or shorter than about half of the resonance period Th, that is, Th/2. Here, N is an integer indicating a connection state of a capacitive voltage conversion circuit, in this example, TN is T1 or T2.

When the switching frequency Fs is lower than the resonant frequency Fh, because current flows in the reverse direction, the same or substantially the same amount of current flows in the forward direction. Consequently, the efficiency of voltage conversion is decreased. When the switching frequency Fs is equal to or higher than the resonant frequency Fh, no current flows in the reverse direction, and the efficiency of voltage conversion is improved. If this is also described with respect to time, when the switching period T is shorter than about half of the resonance period Th, the efficiency is improved to the maximum extent.

FIGS. 7A to 7E are timing charts illustrating examples of the relationship between the period of the first connection state Φ1 and the period of the second connection state Φ2 in the voltage converter 1. FIG. 7A indicates an example in which the period of the first connection state Φ1 is equal to the period of the second connection state Φ2, and the switching period T is equal to the total of the period T1 of the first connection state Φ1 and the period T2 of the second connection state Φ2. This means that the duty ratio for switching is about 0.5. In this case, the switching frequency Fs is higher than the resonant frequency Fh. As illustrated in FIGS. 7B, 7C, and 7D, by inserting blank times such as dead times, the on-duty can be set to a value less than about 50%. In this case, as described above, the switching period T is shorter than about half of the resonance period Th.

The method of changing the switching frequency in accordance with load conditions of the voltage converter to improve efficiency is often used for inductive switching regulators. Also according to the present preferred embodiment, it is possible to improve efficiency by, for example, lowering the switching frequency so as to reduce losses caused by activating the switches when the load is relatively light. Also in such a case, it is important to maintain the above-described relationship between the switching period and the resonance period.

Another method other than the method described above is to extend the switching period while maintaining the approximately 0.5 duty ratio by extending both the period of the first connection state Φ1 and the period of the second connection state Φ2, as illustrated in FIG. 7E. This control method can be used within the range in which the relationship between the switching frequency Fs and the resonant frequency Fh is maintained.

The waveform indicated by the voltage Vx in FIG. 8 is a waveform of the voltage Vx at the node Nx that is the connection point of the intermediate capacitor Cx and the inductor Lx in the voltage converter 1. The waveform indicated by a voltage Vout1 in FIG. 8 is a waveform of the output voltage Vout in the case in which the inductor Lx is excluded from the voltage converter 1 illustrated in FIG. 1. The waveform indicated by a voltage Vout2 in FIG. 8 is a waveform of the output voltage Vout in the case in which the voltage converter 1 illustrated in FIG. 1 includes the inductor Lx and the output capacitor Cout.

When the inductor Lx is not included, the ripple of the output voltage Vout (waveform of the voltage Vout1) is relatively small. Thus, if switching is provided by comparing the output voltage Vout used as feedback information to a threshold, stable feedback operation cannot be performed.

When the voltage detector 13 detects the output voltage Vout smoothed by the output capacitor Cout, the ripple of the voltage is relatively small as illustrated as the waveform of the voltage Vout2. Thus, if switching is provided by comparing the output voltage Vout used as feedback information to a threshold, stable feedback operation cannot be performed. Particularly in the region of relatively small output currents, the ripple of the voltage is smaller, and feedback operation is more unstable.

In contrast, in the present preferred embodiment, the ripple of the voltage Vx at the node Nx that is the connection point of the intermediate capacitor Cx and the inductor Lx is considerably large. Thus, very stable feedback operation can be performed by providing switching by comparing the voltage Vx at the node Nx that is the connection point of the intermediate capacitor Cx and the inductor Lx, which is used as feedback information, to a threshold.

The magnitude of the amplitude of the voltage Vx is proportional to a load current. Feedback control is performed when the voltage Vx at the node Nx decreases by a predetermined value (for example, about 100 mV), so that the voltage Vx at the node Nx that is the connection point of the intermediate capacitor Cx and the inductor Lx increases. As the load current increases, the time taken to pass current shortens, the time taken to decrease the current thus shortens, and as a result, the speed to increase the output voltage Vout increases. This means that the switching frequency increases. Conversely, as the load current decreases, the switching frequency decreases.

The controller 17 illustrated in FIG. 1 provides switching of the switch by using a frequency determined by conditions including the maximum frequency and the minimum frequency of the switching frequency. The minimum frequency is set to be lower than a resonant frequency determined by at least one flying capacitor, the intermediate capacitor Cx, the inductor Lx, and the output capacitor Cout. This is because, when the output current is less than a given threshold, the ratio of losses caused by activating the switching elements is higher than the ratio of losses caused by the current flowing in the reverse direction in the circuit. This means that, in this condition, the efficiency is improved more when the switches are activated by a frequency lower than the resonant frequency. The minimum frequency is set to be higher than audio frequencies. This configuration can reduce or prevent the occurrence of audible noise due to switching by using an audio frequency.

The controller 17 illustrated in FIG. 1 provides switching of the switch by using a frequency determined by conditions including the maximum frequency and the minimum frequency of the switching frequency. The maximum frequency is set to be higher than a resonant frequency determined by at least one flying capacitor, the intermediate capacitor Cx, the inductor Lx, and the output capacitor Cout. This is because, when the output current is equal to or more than a given threshold, the ratio of losses caused by the current flowing in the reverse direction in the circuit is higher than the ratio of losses caused by activating the switching elements. This means that, in this condition, the efficiency is improved more when the switches are activated by a frequency higher than the resonant frequency. The maximum frequency is set to be lower than an upper-limit frequency at which the switch is operable. With this configuration, switching can always be provided within the frequency range in which the switch is operable.

Second Preferred Embodiment

A second preferred embodiment of the present invention describes, as an example, a voltage converter in which the flying capacitor and the switch are partially configured in a common manner.

Figure 9:
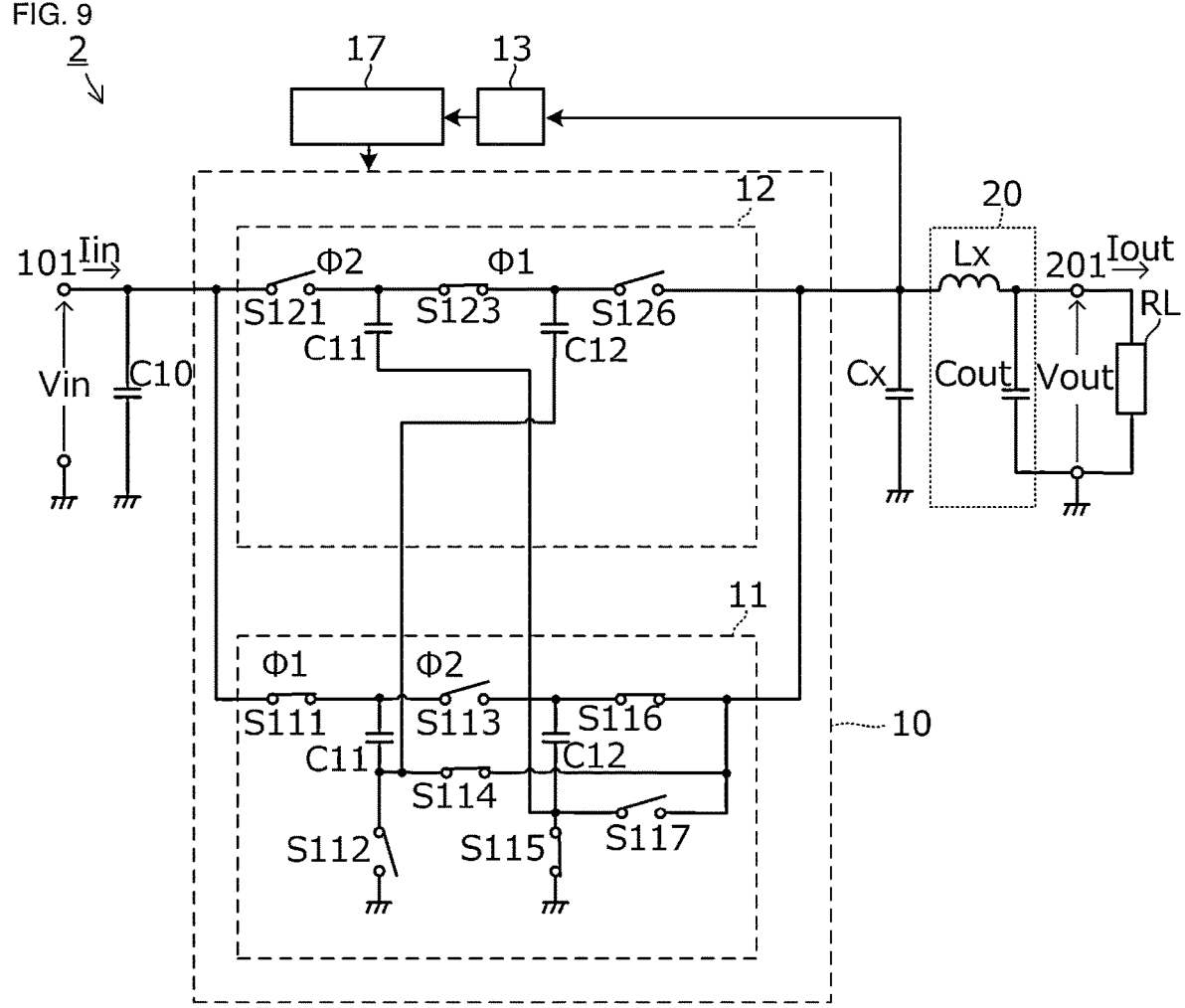
FIG. 9 is a circuit diagram of a voltage converter according to a second preferred embodiment of the present invention.

FIG. 9 is a circuit diagram of a voltage converter 2 according to the second preferred embodiment. Instead of being entirely configured in a duplicated manner, the voltage converter 2 is provided by a circuit partially configured in a duplicated manner to operate in an interleaved manner. As it can be seen in comparison to FIG. 2, the flying capacitor C10 is shared by the first capacitive voltage conversion circuit 11 and the second capacitive voltage conversion circuit 12. The intermediate capacitor Cx is also shared by the first capacitive voltage conversion circuit 11 and the second capacitive voltage conversion circuit 12. Because the switch elements S112, S114, S115, and S117 generate positive and negative pulses, these switch elements can be provided in a shared manner when the order of connecting the switch elements is appropriately changed.

Third Preferred Embodiment

A third preferred embodiment of the present invention describes as an example a voltage converter including an inductive converter.

Figure 10:
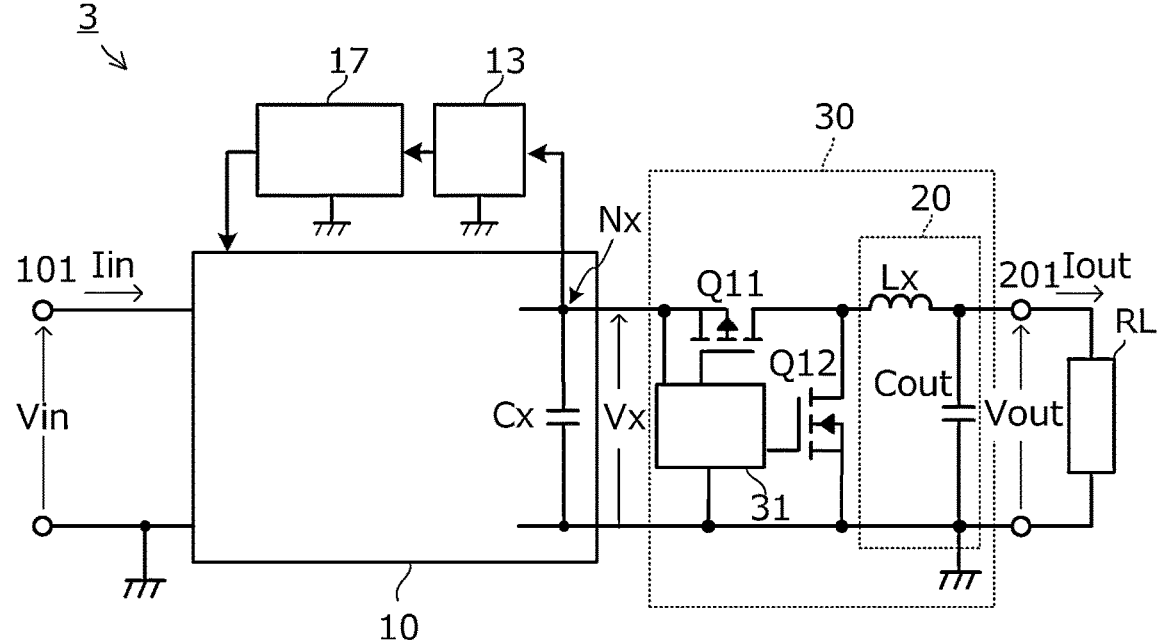
FIG. 10 is a block diagram of a voltage converter according to a third preferred embodiment of the present invention.

FIG. 10 is a block diagram of a voltage converter 3 according to the third preferred embodiment. In the present preferred embodiment, an inductive buck converter 30 is coupled in the subsequent stage after the capacitive voltage conversion circuit 10. The LC circuit 20 is defined by the inductor Lx and the output capacitor Cout that are included in the inductive buck converter 30.

The inductive buck converter 30 includes a rectifier switch element Q11, a commutator switch element Q12, the inductor Lx, the capacitor Cout, and a driver 31. The rectifier switch element Q11 is, for example, a p-type metal-oxide-semiconductor field-effect transistor (MOS-FET). The commutator switch element Q12 is, for example, an n-type MOS-FET. The driver 31 provides switching of the rectifier switch element Q11 and the commutator switch element Q12 in an alternating manner. This buck converter 30 may be provided as a plurality of circuits coupled in parallel with each other, and the plurality of buck converters may operate in an interleaved manner.

Fourth Preferred Embodiment

A fourth preferred embodiment of the present invention describes as an example a voltage converter including a plurality of capacitive voltage conversion circuits and a voltage converter including main portions of a plurality of capacitive voltage conversion circuits.

Figure 11:
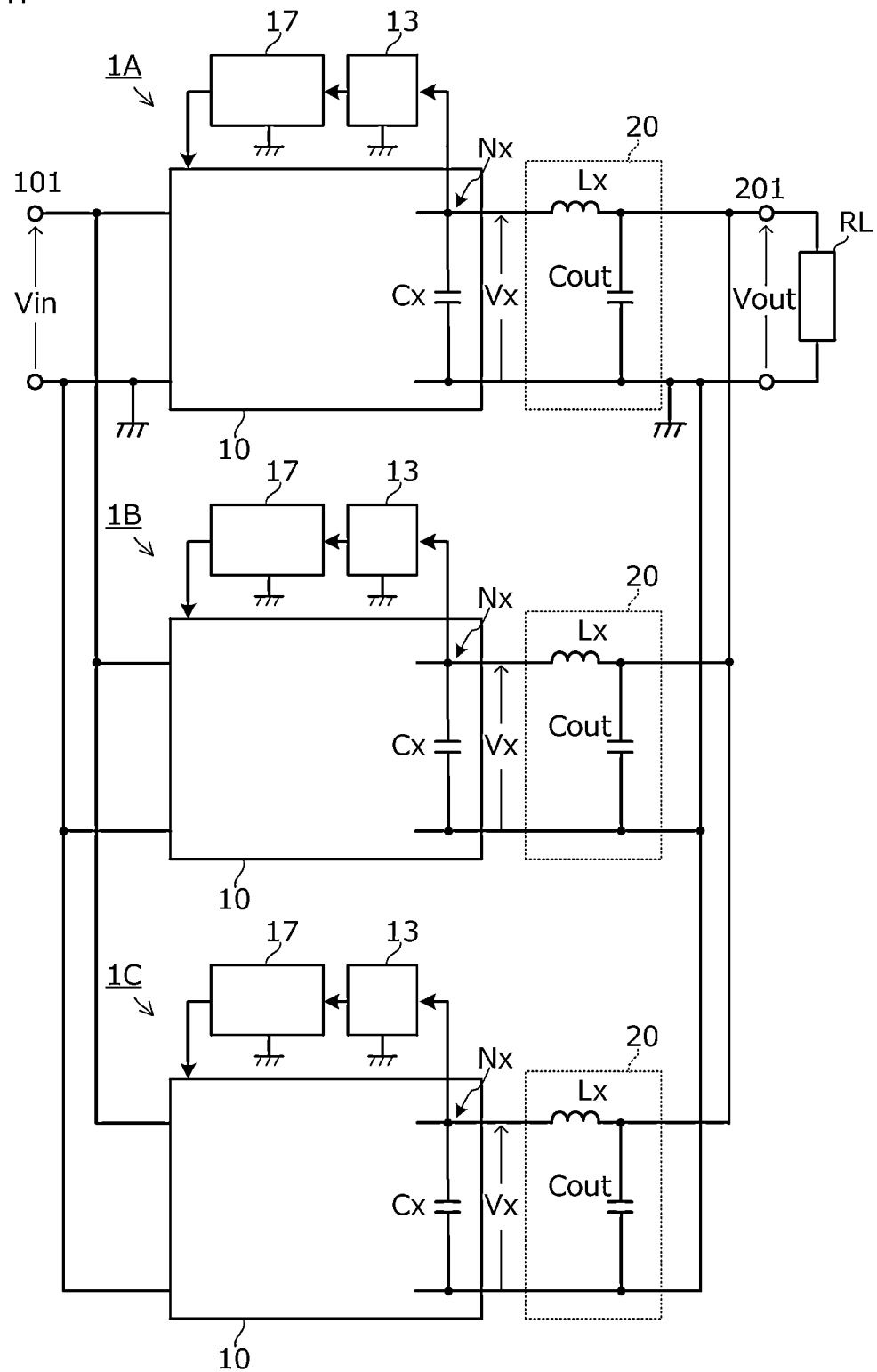
FIG. 11 is a block diagram of a voltage converter according to a fourth preferred embodiment of the present invention.

FIG. 11 is a block diagram of a voltage converter according to the fourth preferred embodiment. This voltage converter includes three voltage converters 1A, 1B, and 1C. The voltage converters 1A, 1B, and 1C each include the capacitive voltage conversion circuit 10, the voltage detector 13, the controller 17, the inductor Lx, and the output capacitor Cout.

The inputs of the three capacitive voltage conversion circuits 10 are coupled in parallel with each other. The input terminal 101 for the input voltage Vin is shared by the three capacitive voltage conversion circuits 10. The output capacitors Cout are coupled in parallel with each other. The output terminal 201 for the output voltage Vout is shared by the three capacitive voltage conversion circuits 10.

Also when the plurality of voltage converters 1A, 1B, and 1C are coupled in parallel with each other, the voltage detector 13 of the voltage converter 1A detects the voltage at the intermediate capacitor Cx at the output portion of the capacitive voltage conversion circuit 10 of the voltage converter 1A. Similarly, the voltage detector 13 of the voltage converter 1B detects the voltage at the intermediate capacitor Cx at the output portion of the capacitive voltage conversion circuit 10 of the voltage converter 1B, and the voltage detector 13 of the voltage converter 1C detects the voltage at the intermediate capacitor Cx at the output portion of the capacitive voltage conversion circuit 10 of the voltage converter 1C.

Here, if the voltage converters are each configured to change the state of switches in accordance with a result of comparing the output voltage Vout to the threshold, and the threshold varies among the voltage converters, only the voltage converter of a relatively high threshold voltage to be compared to the output voltage Vout is activated. This means that, with known configurations, because the common output voltage Vout of small ripple is detected, the ratio of load on the voltage converter of a relatively high threshold voltage increases, which destroys the balance among the plurality of voltage converters. If the comparator has no offset, the voltage converters provide switching at the same frequency. However, this is not practical when the individual voltage converters are disposed in parallel with each other. Furthermore, when the capacitance of the capacitor varies among the capacitive voltage conversion circuits, the capacity of transmitting electric charges also varies, and as a result, the output current varies among the voltage converters.

In contrast, in the present preferred embodiment, not the common output voltage Vout but the voltage Vx at the node that is the connection point of the intermediate capacitor Cx and the inductor Lx of each voltage converter is detected and fed back (to control switching of the switches of the capacitive voltage conversion circuit 10), and thus, the converters parallelly operate in a well-balanced manner. Specifically, the voltage converters 1A, 1B, and 1C of the present preferred embodiment are separated from each other by the inductors Lx, and the voltage Vx decreases at a speed based on the discharge rate determined by, for example, the flying capacitors, the intermediate capacitor Cx, and the resistance components of the switches of each of the voltage converters 1A, 1B, and 1C. Thus, the voltage converters 1A, 1B, and 1C coupled in parallel with each other can each operate at an optimum operating frequency with respect to its load by using a ripple voltage based on its characteristics. As a result, when the capacitance of the capacitor and the performance of voltage conversion differ among the voltage converters operating in parallel with each other, the balance of losses and heat can be established by using corresponding operating frequencies.

Figure 12:
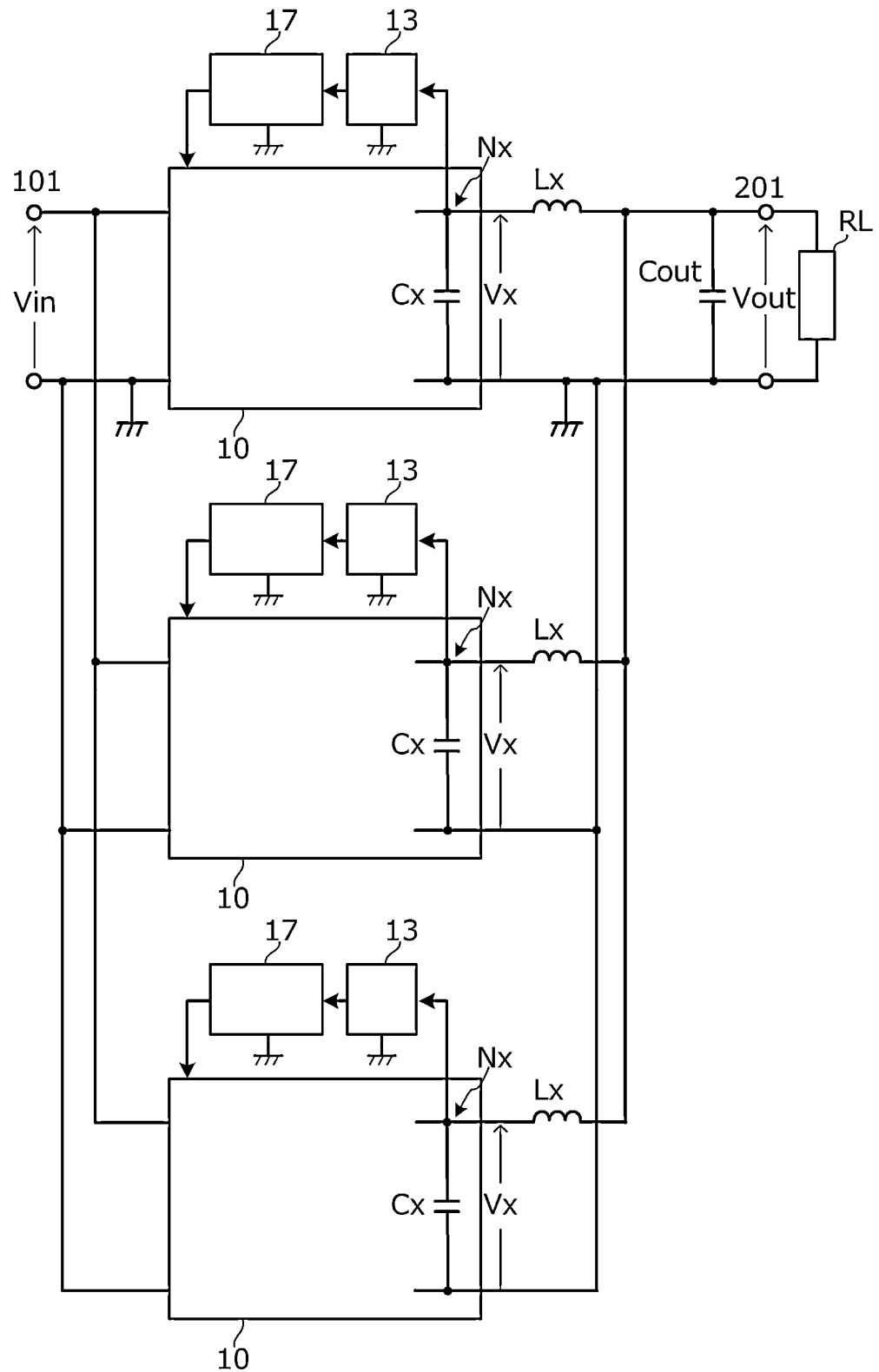
FIG. 12 is a block diagram of another voltage converter according to the fourth preferred embodiment of the present invention.

FIG. 12 is a block diagram of another voltage converter according to the present preferred embodiment. This voltage converter includes three capacitive voltage conversion circuits 10 configured to receive the input voltage Vin, convert the input voltage Vin into voltage, and output the voltage. The voltage converter also includes the single (common) output capacitor Cout and the inductors Lx coupled in series between the respective capacitive voltage conversion circuits 10 and the output capacitor Cout. The voltage converter also includes the voltage detectors 13 and the controllers 17 that are provided for the respective capacitive voltage conversion circuit 10.

The capacitive voltage conversion circuit 10 includes a plurality of switches, at least one flying capacitor, and the intermediate capacitor Cx provided at an output portion. The voltage detectors 13 individually detect the voltage at the node that is the connection point of the intermediate capacitor Cx and the inductor Lx.

The controller 17 provided for each capacitive voltage conversion circuit 10 controls the switches provided for the capacitive voltage conversion circuit 10 by comparing the detection result of the voltage detector 13 to the threshold so as to cause the switches to change between at least two kinds of states.

Also in the case of the voltage converter illustrated in FIG. 12, not the common output voltage Vout but the voltage Vx at the node that is the connection point of the intermediate capacitor Cx and the inductor Lx of each voltage converter is detected and fed back (to control switching of the switches of the capacitive voltage conversion circuit 10), and thus, the voltage converter in illustrated in FIG. 12 achieves the same or substantially the same advantageous effects as the voltage converter illustrated in FIG. 11. Specifically, when the capacitance of the capacitor and the performance of voltage conversion differ among the voltage converters operating in parallel with each other, the balance of losses and heat can be established by using corresponding operating frequencies.

The examples in FIGS. 11 and 12 indicate voltage converters including three capacitive voltage conversion circuits 10, for example, but the number of the capacitive voltage conversion circuits 10 is not limited to this instance. When an even number of the capacitive voltage conversion circuits 10 are included, particular advantageous effects can be achieved with the following configuration: an even number of the capacitive voltage conversion circuits 10 are coupled in parallel with each other, the input terminal 101 for input voltage and the output terminal 201 for output voltage are shared by the capacitive voltage conversion circuits 10, the capacitive voltage conversion circuits 10 have at least a first connection state and a second connection state depending on the connection state of a plurality of switches, and a first resonant frequency determined by the intermediate capacitor, the output capacitor, and the inductor of the capacitive voltage conversion circuit 10 in the first connection state is equal or substantially equal to a second resonant frequency determined by the intermediate capacitor, the output capacitor, and the inductor of the capacitive voltage conversion circuit in the second connection state. This configuration can reduce or prevent variations in heat generation and deterioration over time because the capacitive voltage conversion circuits are unbalanced with respect to output current.

Fifth Preferred Embodiment

A fifth preferred embodiment of the present invention describes as an example a voltage converter in which a capacitive voltage conversion circuit is controlled by comparing the voltage Vx to a threshold provided by a function of a variable of the voltage Vx at the node that is the connection point of the intermediate capacitor Cx and the inductor Lx and a variable of the input voltage Vin.

Figure 13:
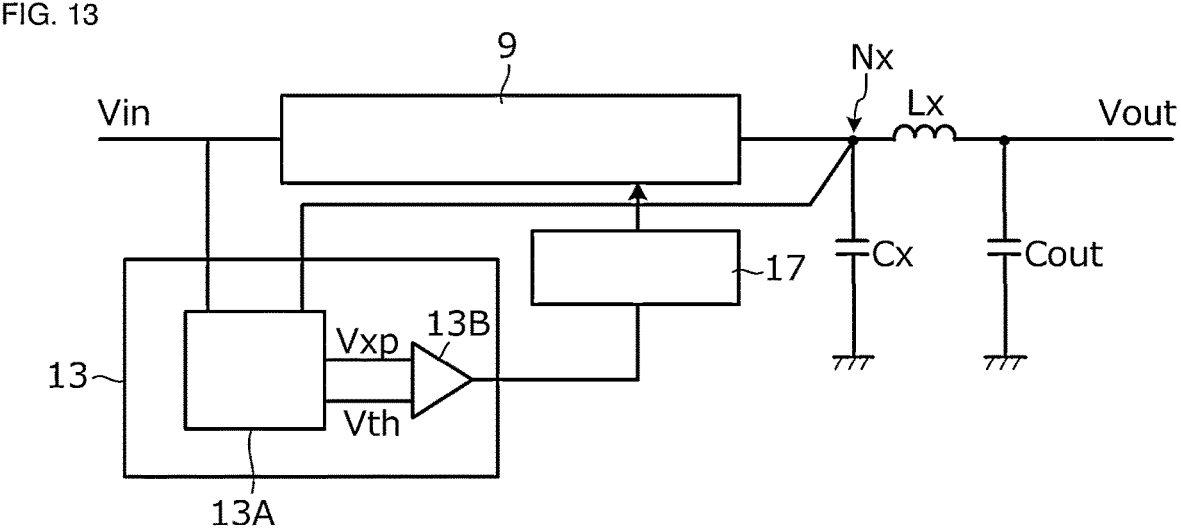
FIG. 13 is a block diagram of a voltage converter according to a fifth preferred embodiment of the present invention.

FIG. 13 is a block diagram of a voltage converter according to the fifth preferred embodiment. This voltage converter includes a capacitive voltage conversion circuit 9 configured to receive the input voltage Vin, convert the input voltage Vin into the output voltage Vout, and output the output voltage Vout. This voltage converter also includes the intermediate capacitor Cx, the output capacitor Cout, the inductor Lx coupled in series between the capacitive voltage conversion circuit 9 and the output capacitor Cout, the voltage detector 13, and the controller 17.

The voltage detector 13 includes a reference-voltage generation circuit 13A and a comparator circuit 13B. The reference-voltage generation circuit 13A outputs a threshold voltage Vth(t) in accordance with a known step-down or step-up ratio 1/DIVN of the capacitive voltage conversion circuit 9, an optimum output voltage calculated based on the input voltage, a difference limit Vtd from the optimum output voltage, and a slope voltage vs(t) to control the threshold to decrease with time. The reference-voltage generation circuit 13A also outputs a voltage Vxp obtained by processing the voltage Vx at the node Nx in a predetermined manner. Alternatively, the voltage Vx at the node Nx is outputted as the voltage Vxp without any processing.

The comparator circuit 13B compares the voltage Vxp to the threshold voltage Vth with respect to the level of voltage. The controller 17 controls the switches in the capacitive voltage conversion circuit 9 in accordance with outputs from the comparator circuit 13B.

Figure 14:
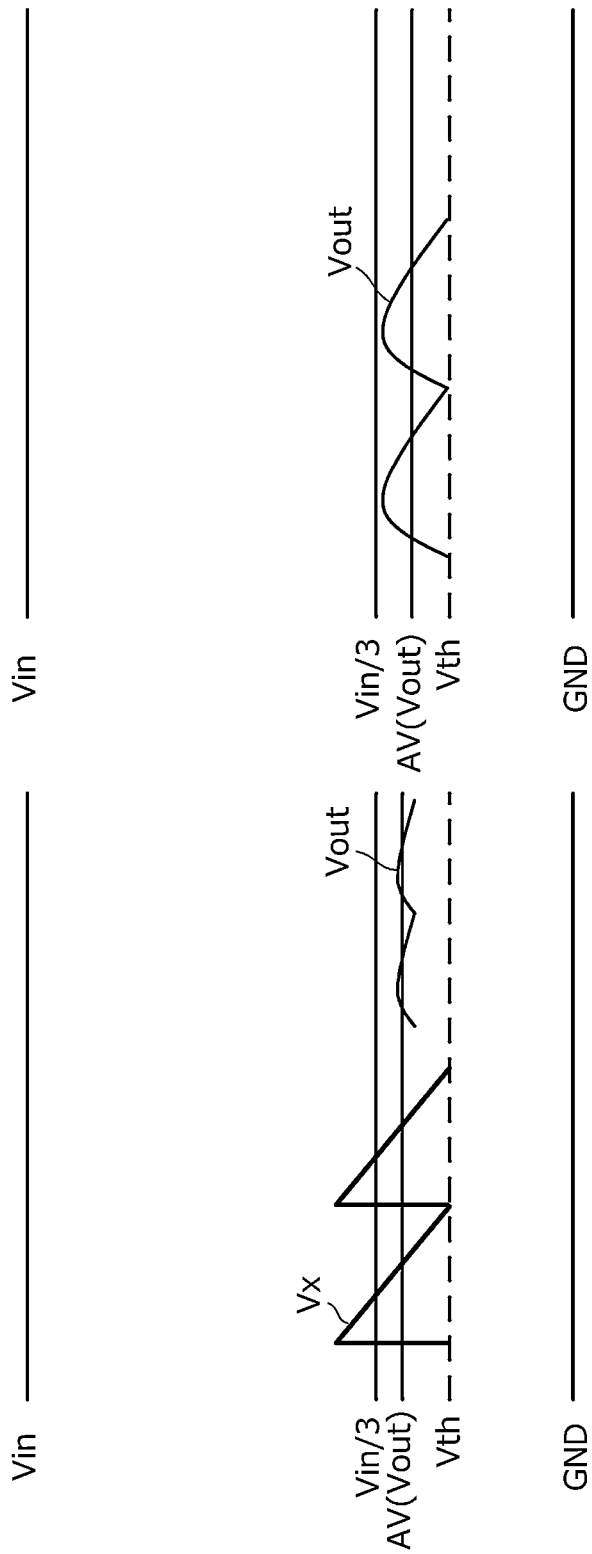
FIG. 14A is a waveform diagram illustrating a plot of the voltage at the node with respect to a threshold voltage.
FIG. 14B is a waveform diagram illustrating a plot of an output voltage with respect to the threshold voltage in the case in which the output voltage is detected and fed back as in known voltage converters.

FIG. 14A is a waveform diagram illustrating a plot of the voltage Vx at the node Nx with respect to the threshold voltage Vth. FIG. 14B is a waveform diagram illustrating a plot of the output voltage Vout with respect to the threshold voltage Vth in the case in which the output voltage Vout is detected and fed back as in known voltage converters.

Here, the threshold voltage Vth is provided by the following expression: Vth=Vin/DIVN−Vr, where 1/DIVN is the ratio of the output voltage Vout of the capacitive voltage conversion circuit 9 to the input voltage Vin, and Vr is a maximum value of drop voltage of the output voltage due to the output current. In the example in FIG. 14A and the example in FIG. 14B, 1/DIVN=about ⅓. In FIGS. 14A and 14B, AV(Vout) is an average value of the output voltage Vout.

As seen in FIG. 14B, in the case in which the output voltage Vout is detected and fed back as in known voltage converters, the ripple of the output voltage is relatively large, and additionally, the average voltage of the output voltage Vout is relatively low.

In contrast, according to the present preferred embodiment, by detecting the voltage Vx at the node Nx, it is possible to leave a sufficient noise margin and reduce or prevent decreases in the output voltage Vout as illustrated in FIG. 14A.

In FIG. 13, the reference-voltage generation circuit 13A outputs the threshold voltage Vth(t) in accordance with the input voltage Vin, the known step-down or step-up ratio 1/DIVN of the capacitive voltage conversion circuit 9, the difference limit Vtd, and the slope voltage vs(t). The threshold voltage Vth(t) is provided by, for example, the following expression:

$$Vth(t)=Vin/DIVN-Vtd+vs(t) \qquad \text{(Expression 4)}$$

Figure 15:
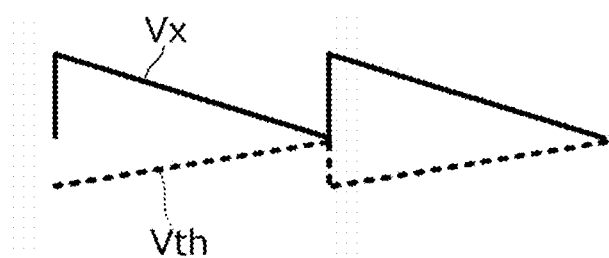
FIG. 15 is a waveform diagram of a voltage converter in which, after the result of comparing the voltage at the node to the threshold voltage reverses, the threshold voltage changes with time in the direction opposite to the direction in which the voltage at the node changes.

This yields the waveform illustrated in FIG. 15. FIG. 15 is a waveform diagram of a voltage converter in which, after the result of comparing the voltage Vx at the node to the threshold voltage Vth is reversed, the threshold voltage Vth changes with time in the direction opposite to the direction in which the voltage Vx at the node changes.

The voltage detector detects the voltage Vx at the node, and the threshold voltage Vth is determined such that, after the result of comparing the voltage Vx at the node to the threshold voltage Vth is reversed, the threshold voltage Vth changes (slopes) with time in the direction opposite to the direction in which the voltage Vx at the node changes (slopes), as illustrated in FIG. 15.

This configuration increases the angle between the voltage Vx at the node and the threshold voltage Vth, and as a result, noise resistance is improved.

The state in the preferred embodiments described above is the state in which the slope voltage vs(t)=0. When Vout is an optimum voltage (no load), Vth=Vin/DIVN. The predetermined value, for example, about 100 mV, described above is Vtd in Expression 4, that is, Vtd=about 100 mV. Because vs(t) is 0 in the examples described above, Vth(t)=Vin/DIVN−100 mV.

The slope vs(t) can be present or absent, although FIG. 15 illustrates the example in which vs(t)≠0.

The configuration described above is an example. The voltage detector 13 may generate a detection signal by applying gain to both the input voltage Vin and the feedback voltage Vx and comparing the input voltage Vin and the feedback voltage Vx. The voltage detector 13 may add the slope to the feedback voltage Vx instead of the threshold voltage Vth to accelerate detection.

Other Preferred Embodiments

The above-described preferred embodiments describe examples in which two Dickson circuits are coupled in parallel with each other and operate in an interleaved manner, but, for example, a single series-parallel charge pump circuit may be used. Instead of single-phase or two-phase, for example, a multiphase capacitive voltage conversion circuit may be provided.

The voltage converters described as the above preferred embodiments use the example in which a single inductor and a single capacitor defining the LC circuit 20 are included for ease of description. However, a plurality of inductors and a plurality of capacitors may be used. The above description is about the capacitive voltage conversion circuit 10 including a circuit board and chip components, but the capacitors of the capacitive voltage conversion circuit 10 may be partially or entirely disposed in a multilayer substrate.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A voltage converter comprising:
   at least one capacitive voltage conversion circuit to receive an input voltage, convert the input voltage into an output voltage, and output the output voltage;
   an output capacitor;
   at least one inductor coupled in series between the capacitive voltage conversion circuit and the output capacitor;
   a voltage detector; and
   a controller; wherein
   the capacitive voltage conversion circuit includes a plurality of switches, at least one flying capacitor, and an intermediate capacitor at an output portion of the capacitive voltage conversion circuit;
   the voltage detector is configured to detect a voltage at a node that is a connection point of the intermediate capacitor and the inductor;
   the voltage detector is configured to detect a voltage relating to a difference between the voltage at the node and the input voltage; and
   the controller is configured or programmed to control the switches to change between at least two states by comparing the voltage at the node to a threshold voltage.

2. The voltage converter according to claim 1, wherein
the controller is configured or programmed to control the switches by using a frequency that is set by using conditions including a maximum frequency and a minimum frequency; and
the maximum frequency is set to be higher than a resonant frequency determined by the at least one flying capacitor, the intermediate capacitor, the inductor, and the output capacitor.

3. The voltage converter according to claim 1, wherein a capacitance of the intermediate capacitor is smaller than a capacitance of the flying capacitor, and the capacitance of the flying capacitor is smaller than a capacitance of the output capacitor.

4. The voltage converter according to claim 1, wherein, after a result obtained by the voltage detector by comparing a detection result to the threshold voltage is reversed, the threshold voltage changes with time in a direction opposite to a direction in which the voltage at the node changes.

5. The voltage converter according to claim 1, wherein the at least one capacitive voltage conversion circuit includes a first capacitive voltage conversion circuit and a second capacitive voltage conversion circuit coupled in parallel with each other.

6. The voltage converter according to claim 1, wherein a value of the threshold voltage is based on the input voltage.

7. The voltage converter according to claim 1, wherein
the at least one capacitive voltage conversion circuit includes a plurality of capacitive voltage conversion circuits;
the at least one inductor includes a plurality of inductors;
the plurality of capacitive voltage conversion circuits are coupled in parallel with each other at input portions of the plurality of capacitive voltage conversion circuits; and
the plurality of inductors are coupled in parallel with each other on output sides of the plurality of inductors.

8. The voltage converter according to claim 7, wherein
an even number of the capacitive voltage conversion circuits are provided;
the even number of the capacitive voltage conversion circuits are coupled in parallel with each other;
the capacitive voltage conversion circuits share an input terminal for the input voltage;
the capacitive voltage conversion circuits share an output terminal for the output voltage;
the capacitive voltage conversion circuits have at least a first connection state and a second connection state that are each determined by a connection state of the switches; and
a first resonant frequency determined by the intermediate capacitor of the capacitive voltage conversion circuit, the output capacitor, and the inductor in the first connection state is equal or substantially equal to a second resonant frequency determined by the intermediate capacitor of the capacitive voltage conversion circuit, the output capacitor, and the inductor in the second connection state.

9. The voltage converter according to claim 8, wherein each of the first and second capacitive voltage conversion circuits includes a plurality of the flying capacitors.

10. The voltage converter according to claim 8, wherein the intermediate capacitor is shared by the first and second capacitive voltage conversion circuits.

11. The voltage converter according to claim 1, wherein an inductive buck converter is coupled with the capacitive voltage conversion circuit.

12. The voltage converter according to claim 11, wherein the inductive buck converter includes a rectifier switch, a commutator switch, and a driver.

13. The voltage converter according to claim 12, wherein the rectifier switch is a p-type metal-oxide-semiconductor field-effect transistor.

14. The voltage converter according to claim 12, wherein the commutator switch is an n-type metal-oxide-semiconductor field-effect transistor.

15. The voltage converter according to claim 12, wherein the driver is configured to alternately switch between the rectifier switch and the commutator switch.

16. The voltage converter according to claim 1, wherein
the controller is configured or programmed to control the switches by using a frequency that is set by using conditions including a maximum frequency and a minimum frequency; and
the minimum frequency is set to be lower than a resonant frequency determined by the at least one flying capacitor, the intermediate capacitor, the inductor, and the output capacitor.

17. The voltage converter according to claim 16, wherein the threshold voltage is set such that operation is performed by using a frequency lower than the resonant frequency under a light load condition.

18. A voltage converter comprising:
a plurality of capacitive voltage conversion circuits to receive an input voltage, convert the input voltage into a voltage, and output the voltage;
a common output capacitor;
a plurality of inductors coupled in series between the respective capacitive voltage conversion circuits and the output capacitor;
a plurality of voltage detectors; and
a plurality of controllers to control the respective capacitive voltage conversion circuits; wherein
each of the capacitive voltage conversion circuits includes a plurality of switches, at least one flying capacitor, and an intermediate capacitor provided at an output portion of the capacitive voltage conversion circuit;
each of the voltage detectors is configured to detect a voltage at a node that is a connection point of the intermediate capacitor and the inductor;
each of the controllers to control the respective capacitive voltage conversion circuits is configured or programmed to control the switches of the corresponding capacitive voltage conversion circuit by comparing a detection result of the voltage detector to a threshold to cause the switches to change between at least two kinds of states.

* * * * *